Oct. 20, 1953
H. O. RAMOS
2,655,664
EXPANSIBLE STRAP
Filed May 28, 1951
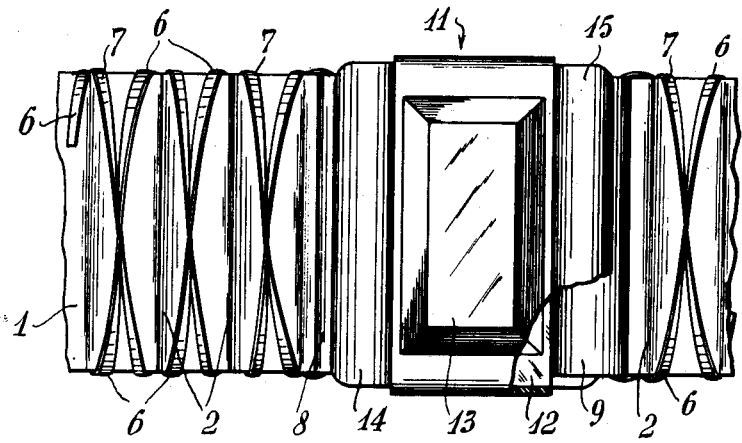
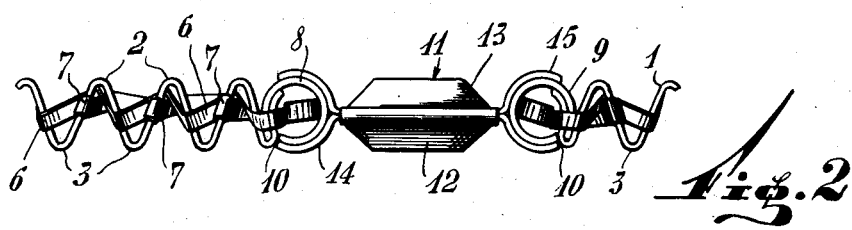
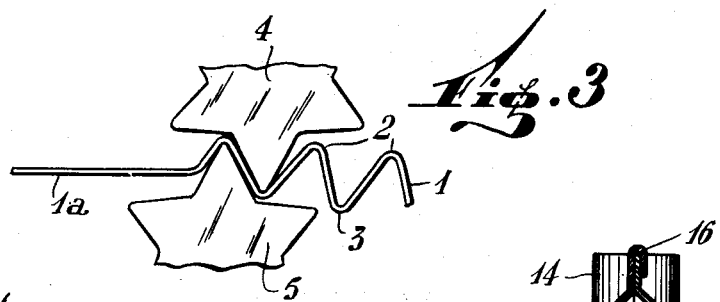
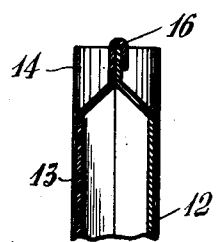
INVENTOR,
Hector Orestes Ramos
BY Ivan P. Tashof,
ATTORNEY Patented Oct. 20, 1953

2,655,664

UNITED STATES PATENT OFFICE 2,655,664

EXPANSIBLE STRAP

Hector O. Ramos, Buenos Aires, Argentina, assignor to Carlos Menendez, Buenos Aires, Argentina Application May 28, 1951, Serial No. 228,578

2 Claims. (Cl. 2—338)

The present invention refers to improvements in or relating to belts.

One of the principal objects of the present invention is to provide an elastic belt which preserves its full resiliency during use so that it will not permanently lose its original length and shape even if it is subject to extensive stretching during use.

Another purpose of the invention is to provide a belt of the kind specified which may be manufactured from relatively cheap and readily available materials.

Another purpose of the invention is to provide a buckle or closure member for a belt of the type specified.

A further object of the invention is to provide a belt and closure member assembly of very attractive appearance.

In order to achieve these and other objects, a belt according to the present invention comprises an elastic undulated tape and two strips helically wound around said tape in opposite directions, each turn of each strip embracing the portion between a crest and a hollow of the tape.

Other features of the invention will be evident from the following detailed description of one preferred embodiment thereof, which has been illustrated by way of example in the accompanying drawings wherein:

Figure 1 is a plan view of a belt according to the present invention with parts of the buckle or closure member broken away;

Figure 2 is a lateral view of said belt;

Figure 3 schematically shows one given stage of the manufacture of an undulated tape or band as used in said belt;

Figure 4 shows a detail of the belt at one given stage of manufacture, with parts broken away; and Figure 5 is a partial cross section through the buckle.

Throughout the several figures of the drawings, the same reference numerals have been used in order to designate equal or corresponding parts.

Referring to Figures 1 and 2, it will be seen that the belt according to the embodiment shown comprises a tape or band 1 which has regular undulations comprising the crests 2 and the hollows 3. This tape is made of any suitable material, for instance plastic sheet material, film, nylon or the like. The undulations are produced by any suitable means and if necessary under heat. The material for making the tape must be such that the tape must tend to preserve its shape and to recover its original form if it has been stretched by flattening the undulations. One suitable material is common photographic film material but if this is used several films should be joined together by heat treatment so as to obtain a relatively thick tape consisting of several layers.

In Figure 3 a suitable method of producing the undulations is illustrated. The sheet or film 1a, which may consist of several layers bonded together by heat or with the aid of interposed bonding material or which may be one single sheet of suitable, for instance plastic, material, is passed through the space between two teethed rollers 4 and 5, so that it permanently adopts the shape of the teeth. Before and/or after this treatment, the film or sheet 1a or 1, respectively, is subjected to the necessary degree of heat.

As shown in Figures 1, 2 and 4, two strips 6 and 7 are helically wound around tape 1 in opposite directions. As may be seen, strip 6, at the left end of Figure 1, passes over the upper face and upper edge of tape 1, near the first crest 2 thereof; after passing over the lower face of tape 1 it rises again over the lower edge of the second crest 2 to the upper face of tape 1. In the hollows 3 it crosses strip 7 which is wound in an opposite direction. The strips are extensible.

The end portions of the tape 1 are housed in tubular end members 8 and 9 which extend over the whole width of tape 1. Each end member 8, 9 is provided with a longitudinal slit 10 through which the end of tape 1 is inserted.

The end portions of strips 6 and 7 are also housed within the tubular end members 8 and 9 and inside these they are joined together as shown more specifically in Figure 4. The end portion of strip 7 is first passed lengthwise through tubular member 8 in one direction and then folded and passed again through the member 8 in an opposite direction. Thereby a loop 7a is formed through which the end portion of strip 6 is passed. The outermost end of strip 7, which protrudes from one lateral end of tubular end member 8, is then drawn further outwardly whereby the end portion of strip 6 is caused to enter tubular member 8. Both end portions thus exert pressure on the end portion of tape 1 within the end member 8 so that this is safely secured thereto. The ends of strips 6 and 7 which protrude from member 8 may then be cut off. The other end of tape 1 and the other ends of strips 6 and 7 are secured inside tubular end member 9 in a similar way.

The tubular end members 8 and 9 are connected together by means of a buckle or closure member generally indicated at 11 in Figures 1, 2 and 5. This buckle comprises an upper sheet or section 12 and a lower sheet or section 13, preferably made of metal each formed with a semitubular lateral extension 14 at one lateral end and a semitubular lateral extension 15 at the other lateral end. The upper and lower extensions 14 form together a semitubular body which is slipped over end member 8, whilst the similar tubular body consisting of semitubular extensions 15 of sheets 12 and 13 at the other lateral end of the buckle 11 is slipped over tubular end member 9, whereby both end members are connected together.

Figure 5 shows that upper sheet 12 is secured to lower sheet 13 by means of an overlapping extension 16. The buckle 11 covers these sheets and may be provided with decorative elements.

It will be seen that the belt has a high degree of elastic recovery when deformed, because not only tape 1 tends to recover its original undulated shape but also strips 6 and 7 exert pressure on each individual undulation to restore its old shape when it has been flattened out.

As already stated, the belt may be made of plastic material which may be transparent or coloured and if desired the upper face of tape 1 may be coloured differently from the lower face thereof. Also the strips 6 and 7 may be made of plastic material or alternatively they may be made of textile materials. Strips 6 and 7 also may be coloured differently one from another and from tape 1 so that a number of effects can be achieved which give the belt a very attractive appearance.

While preferably a buckle as shown and described herein is used in conjunction with the belt, any other closure member may be employed. If the buckle as described and shown is used, the belt may be worn upside down.

It will be evident that many modifications or alterations may be made in the details described without departing from the scope of the invention as defined in the annexed claims.

I claim:

1. An expansible strap comprising a tape provided with a plurality of evenly spaced undulations defining spaced parallel crests and hollows, and a pair of strips extending in opposite directions and helically around said tape to provide convolutions in said strips, said pair of strips crossing each other centrally of the width of said tape between the crests and hollows of said undulations, said undulated tape being expansible, and said strips being extensible, said strips serving to limit the stretchability of said tape.

2. An expansible strap comprising a tape provided with a plurality of evenly spaced undulations defining spaced parallel crests and hollows, and a pair of strips extending in opposite directions and helically around said tape to provide convolutions in said strips, said pair of strips crossing each other centrally of the width of said tape between the crests and hollows of said undulations, said undulated tape being expansible, and said strips being extensible, said strips serving to limit the stretchability of said tape, the ends of said strips being connected to each other at the ends of said tape.

HECTOR O. RAMOS.

References Cited in the file of this patent

UNITED STATES PATENTS

| Number | Name | Date |
| --- | --- | --- |
| 136,599 | House | Mar. 11, 1873 |
| 199,240 | Vinton et al. | Jan. 15, 1878 |
| 655,025 | Simon | July 31, 1910 |
| 1,636,720 | Starbuck | July 26, 1927 |
| 1,751,595 | Nachman et al. | Mar. 25, 1930 |
| 2,217,826 | Van Laer | Oct. 15, 1940 |
| 2,372,330 | Loewensohn | Mar. 27, 1945 |
| 2,412,895 | Lewis | Dec. 17, 1946 |
| 2,434,144 | Cleinman | Jan. 6, 1948 |

FOREIGN PATENTS

| Number | Country | Date |
| --- | --- | --- |
| 10,177 | Great Britain | May 23, 1893 |